US008666377B2

(12) United States Patent
Lee et al.

(10) Patent No.: US 8,666,377 B2
(45) Date of Patent: Mar. 4, 2014

(54) METHOD, SYSTEM AND COMPUTER-READABLE MEDIUM FOR SYNCHRONIZING SPOT INFORMATION

(75) Inventors: Po-Yen Lee, Taoyuan County (TW); Chien-Wen Chen, Taoyuan County (TW); Pai-Chang Yeh, Taoyuan County (TW); Li-Wen Lian, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 125 days.

(21) Appl. No.: 13/039,283

(22) Filed: Mar. 2, 2011

(65) Prior Publication Data

US 2011/0217965 A1 Sep. 8, 2011

Related U.S. Application Data (60) Provisional application No. 61/310,247, filed on Mar. 3, 2010, provisional application No. 61/324,303, filed on Apr. 15, 2010.

(51) Int. Cl.
*H04L 29/06* (2006.01)

(52) U.S. Cl.
USPC .............. 455/414.3; 455/414.1; 455/414.2; 455/412.1; 455/457; 709/204; 709/216; 709/219

(58) Field of Classification Search
USPC ............ 455/414.3, 414.1, 414.2, 412.1, 457; 709/204, 216, 219
See application file for complete search history.

(56) References Cited

U.S. PATENT DOCUMENTS

| 6,636,873 B1 * | 10/2003 | Carini et al. ..................... 1/1 |
| 2003/0224760 A1 | 12/2003 | Day |
| 2005/0032527 A1 * | 2/2005 | Sheha et al. ............... 455/456.1 |

(Continued)

FOREIGN PATENT DOCUMENTS

| CN | 1659837 | 8/2005 |
| CN | 101170577 | 4/2008 |
| TW | 200821874 | 5/2008 |
| TW | 201001356 | 1/2010 |

OTHER PUBLICATIONS

"Search Report of European Counterpart Application", issued on May 16, 2011, p. 1-p. 3, in which the listed references were cited.

(Continued)

*Primary Examiner* — Lester Kincaid
*Assistant Examiner* — Mehmood B Khan
(74) *Attorney, Agent, or Firm* — Jianq Chyun IP Office (57) ABSTRACT

A method, a system, and a computer-readable medium for synchronizing spot information, adapted to synchronize a plurality of spot information displayed on a mobile device and a terminal device, are provided. In the present method, when the mobile device logs in to a service end device, the spot information in a spot database of the mobile device is synchronized to the service end device. When the terminal device logs in to the service end device, the spot information synchronized from the mobile device to the service end device is downloaded to the terminal device and displayed in a spot information browsing webpage. When the mobile device receives spot information edited by a user, the mobile device synchronizes the edited spot information to the service end device, and the service end device updates the spot information displayed in the spot information browsing webpage of the terminal device.

13 Claims, 4 Drawing Sheets

(56) References Cited

U.S. PATENT DOCUMENTS

| | | | |
|---|---|---|---|
| 2005/0044235 A1 | 2/2005 | Balahura et al. | |
| 2007/0084333 A1 | 4/2007 | Robbin et al. | |
| 2008/0132252 A1* | 6/2008 | Altman et al. | 455/457 |
| 2009/0282124 A1* | 11/2009 | Rauhala et al. | 709/216 |
| 2009/0315766 A1* | 12/2009 | Khosravy et al. | 342/357.07 |
| 2009/0318168 A1* | 12/2009 | Khosravy et al. | 455/456.3 |
| 2010/0009662 A1* | 1/2010 | Khosravy et al. | 455/414.1 |
| 2010/0280904 A1* | 11/2010 | Ahuja | 705/14.58 |
| 2012/0066303 A1* | 3/2012 | Purdy | 709/204 |
| 2012/0172062 A1* | 7/2012 | Altman et al. | 455/457 |

OTHER PUBLICATIONS

"First Office Action of Europe Counterpart Application", issued on May 20, 2011, p. 1-p. 5, in which the listed references were cited.

"DevelopersLayer", Feb. 1, 2010, XP002633374, Retrieved from the Internet: URL:http://replay.waybackmachine.org/20100102031017/http://layar.com/api/ [retrieved on Apr. 18, 2011].

"First Office Action of China counterpart application" issued on Apr. 24, 2013, p. 1-p. 11, in which the listed references were cited.

"Office Action of Taiwan counterpart application" issued on Nov. 7, 2013, p. 1-p. 6, in which the listed references were cited.

* cited by examiner

METHOD, SYSTEM AND COMPUTER-READABLE MEDIUM FOR SYNCHRONIZING SPOT INFORMATION

CROSS-REFERENCE TO RELATED APPLICATION

This application claims the priority benefits of U.S. provisional application No. 61/310,247, filed on Mar. 3, 2010 and U.S. provisional application No. 61/324,303, filed on Apr. 15, 2010. The entirety of each of the above-mentioned patent applications is hereby incorporated by reference herein and made a part of this specification.

BACKGROUND

In recent years, different types of small-sized and highly portable electronic devices, such as cellular phones and smart phone, have been developed along with the advancement of the electronic technology and the communication technology. Such mobile devices are usually integrated with many different functions in order to improve their market competitiveness. Besides the most common camera, phone call, and Internet access functions, global positioning system (GPS) and electronic maps have also been integrated into handheld communication devices. Accordingly, a user can capture images of the surrounding environment by using the camera function of a mobile device and obtain his/her own position information by using the GPS function of the mobile device anytime and anywhere.

By integrating aforementioned camera and GPS functions, a user is allowed to capture and edit information (for example, pictures, coordinates, and addresses) of different attraction spots by using a mobile device and arrange the information into different spot information for future reference.

However, a mobile device is usually designed to have a very limited size in order to achieve a small and slim appearance. Accordingly, both the screen and the keyboard disposed on the mobile device are limited in their sizes. As a result, the amount of spot information that can be displayed to the user is limited by the reduced size of the mobile device, and editing the spot information is made difficult by the reduced key number and sizes.

SUMMARY

Accordingly, the application is directed to a method, a system, and a computer-readable medium for synchronizing spot information, wherein the spot information displayed on a mobile device and a terminal device is synchronized.

The application provides a spot information synchronization method adapted to synchronize a plurality of spot information displayed on a mobile device and a terminal device. In the spot information synchronization method, when the mobile device logs in to a service end device, spot information in a spot database of the mobile device is synchronized to the service end device. When the terminal device logs in to the service end device, the spot information synchronized from the mobile device to the service end device is downloaded to the terminal device and displayed in a spot information browsing webpage. Herein when the mobile device receives spot information edited by a user, the mobile device synchronizes the edited spot information to the service end device, and the service end device updates the spot information displayed in the spot information browsing webpage of the terminal device.

In an example, the mobile device and the terminal device log in to the service end device by using the same login information.

In an example, after the mobile device and the terminal device log in to the service end device, the spot information synchronization method further comprises when the terminal device receives spot information edited by the user in the spot information browsing webpage, synchronizing the edited spot information to the service end device by using the terminal device and then synchronizing the edited spot information to the spot database of the mobile device by using the service end device.

In an example, the step of receiving the spot information edited by the user in the spot information browsing webpage by using the terminal device comprises receiving the spot information added, deleted, changed, or browsed by the user in the spot information browsing webpage.

In an example, the step of receiving the spot information edited by the user by using the mobile device comprises receiving the spot information added, deleted, changed, or browsed by the user.

In an example, the added spot information is spot information provided by another service end device.

In an example, the added spot information is spot information provided by logging in to the service end device by using another login information.

In an example, the added spot information is current location information of the mobile device.

In an example, after the mobile device logs in to the service end device to synchronize the spot information in the spot database to the service end device, the spot information synchronization method further comprises temporarily storing the spot information synchronized by the mobile device by using the service end device and synchronizing the spot information to the terminal device when the terminal device logs in to the service end device.

In an example, each spot information comprises one or a combination of name, picture, location, category, address, phone number, website, note, privacy, voice memo of a spot, name of a user who shares the spot information, photo of the user who shares the spot information, and establishing date of the spot information.

The application provides a spot information synchronization method adapted to a mobile device. In the spot information synchronization method, the mobile device first logs in to a service end device. When the mobile device receives spot information edited by a user, the mobile device will synchronize the edited spot information to a terminal device through the service end device.

The application provides a spot information synchronization method adapted to a terminal device. In the spot information synchronization method, the terminal device first logs in to a service end device. When the terminal device receives spot information edited by a user, the terminal device will synchronize the edited spot information to a mobile device through the service end device.

The application provides a spot information synchronization system comprising a service end device, a mobile device, and a terminal device. The mobile device logs in to the service end device through a communication network to synchronize spot information in a spot database to the service end device. The terminal device logs in to the service end device through Internet to download the spot information synchronized from the mobile device to the service end device and displays the spot information in a spot information browsing webpage. When the mobile device receives spot information edited by a user, the mobile device synchronizes the edited spot information to the service end device, and the service end device updates the spot information displayed in the spot information browsing webpage of the terminal device.

The application provides a computer-readable medium, which records a computer program to be loaded into a device or a system to execute the spot information synchronization method described above. The computer program is composed of a plurality of program instructions (for example, organization chart establishing program instructions, table approving program instructions, setting program instructions, and deployment program instructions). Steps of the spot information synchronization method described above can be accomplished when these program instructions are loaded into a device or a system and executed by the same.

As described above, the application provides a method, a system, and a computer-readable medium for synchronizing spot information, wherein spot information synchronized by a mobile device is received through a service end device, and the spot information is displayed in a webpage of a terminal device, so that a user can not only edit the spot information by using the mobile device but also browse and edit the spot information in the mobile device by using the terminal device.

BRIEF DESCRIPTION OF THE DRAWINGS

The accompanying drawings are included to provide a further understanding of the application, and are incorporated in and constitute a part of this specification. The drawings illustrate examples of the application and, together with the description, serve to explain the principles of the application.

DESCRIPTION OF THE EXAMPLES

Reference will now be made in detail to the present examples of the application, examples of which are illustrated in the accompanying drawings. Wherever possible, the same reference numbers are used in the drawings and the description to refer to the same or like parts.

In the present application, a mobile device is logged in to a service end device through an Internet accessing function thereof and spot information in the mobile device is synchronized to the service end device such that a user can log in to the service end device through a home computer or any other terminal device so as to download the spot information synchronized by the mobile device and display the spot information in a spot information browsing webpage. The spot described herein may be any place, such as a tourist attraction, a restaurant, a school, a hospital, a gas station, a shop, a building, or an address or a latitude and a longitude set by the user. In addition, every time when the user edits the spot information in the mobile device or in the spot information browsing webpage displayed by the terminal device, the spot information is further synchronized through the service end device. Thereby, a convenient way for browsing and editing the spot information is provided to the user.

Figure 1:
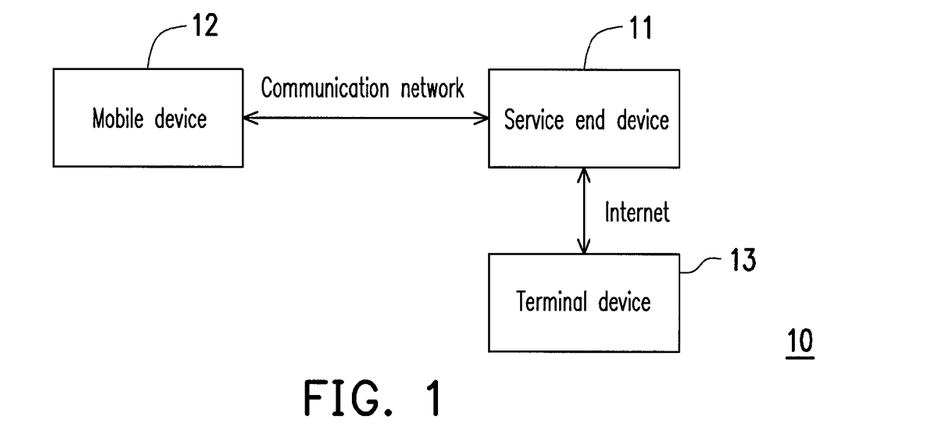
FIG. 1 is a block diagram of a spot information synchronization system according to an example of the application.

FIG. 1 is a block diagram of a spot information synchronization system according to an example of the application. Referring to FIG. 1, the spot information synchronization system 10 comprises a service end device 11, a mobile device 12, and a terminal device 13. The functions of these elements are respectively described below.

The service end device 11 may be a web server disposed at a mobile communication service end. The service end device 11 provides a spot information browsing webpage. A user can browse and edit spot information by connecting to this spot information browsing webpage using the terminal device 13.

The mobile device 12 may be a cellular phone, a personal digital assistant (PDA), or a PDA phone having an Internet accessing function. The mobile device 12 can log in to the service end device 11 through a communication network so as to synchronize the spot information in a spot database to the service end device 11. To be specific, a user end application program may be installed in the mobile device 12. The user end application program provides a spot information management interface, such that the user of the mobile device 12 can directly add, delete, change, or browse the spot information through the spot information management interface.

The terminal device 13 may be a desktop computer, a notebook computer, or a tablet personal computer (PC) with large-sized screen and keyboard. The terminal device 13 can log in to the service end device 11 through the Internet so as to download the spot information synchronized from the mobile device 12 to the service end device 11 and display the spot information in the spot information browsing webpage. To be specific, the user can run a web browser on the terminal device 13 and connect to the service end device 11 through the web browser, so as to display the spot information browsing webpage provided by the service end device 11. A spot information management interface is also provided in the spot information browsing webpage, such that the user of the terminal device 13 can directly add, delete, change, or browse the spot information through the spot information management interface.

The user may not only browse the spot information but also perform different edit operations (e.g. addition, deletion, or change) on a desired spot information through the user end application program in the mobile device 12 or the spot information browsing webpage displayed in the terminal device 13.

It should be noted that regardless of whether the user edits the spot information on the mobile device 12 or the terminal device 13, the edited spot information is always synchronized to the service end device 11 and then synchronized to the mobile device 12 or the terminal device 13 at the other end by the service end device 11. Below, this will be explained in detail with reference to an example.

Figure 2:
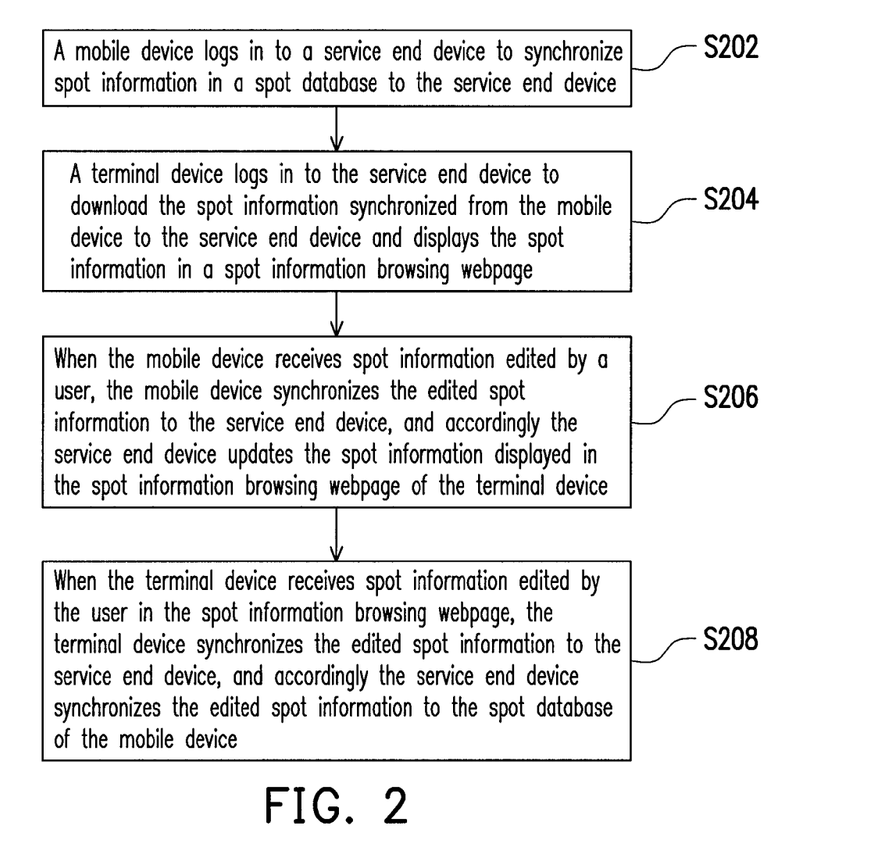
FIG. 2 is a flowchart illustrating a spot information synchronization method according to an example of the application.

FIG. 2 is a flowchart illustrating a spot information synchronization method according to an example of the application. Referring to FIG. 2, the spot information synchronization method of the present example is adapted to the spot information synchronization system 10 illustrated in FIG. 1 to synchronize a plurality of spot information displayed on the mobile device 12 and the terminal device 13. Below, various steps of the spot information synchronization method will be described with reference to various components of the spot information synchronization system 10.

First, the mobile device 12 logs in to the service end device 11 to synchronize spot information in the spot database of the mobile device 12 to the service end device 11 (step S202). Herein the user may log in to the service end device 11 by running a user end application program installed in the mobile device 12. The user end application program may request the user to input his/her login information (e.g. account and password) and log in to the service end device 11 by using the login information. After logging in to the service end device 11, the user end application program synchronizes the spot information stored in the spot database of the mobile device 12 to the service end device 11. The spot information may be one or a combination of name, picture, location, category, address, phone number, website, note, privacy, voice memo of a spot, name of a user who shares the spot information, photo of the user who shares the spot information, and establishing date of the spot information. However, the application is not limited thereto.

Then, the terminal device 13 logs in to the service end device to download the spot information synchronized from the mobile device 12 to the service end device 11 and display the spot information in a spot information browsing webpage (step S204). The user can connect to the service end device 11 by running a web browser installed in the terminal device 13 and log in to the service end device 11 through the web browser. Herein the login information used by the terminal device 13 for logging in to the service end device 11 is the same as that used by the mobile device 12 for logging in to the service end device 11. Accordingly, the service end device 11 can identify the user of the terminal device 13 and establish an association between the terminal device 13 and the mobile device 12 for spot information synchronization.

To be specific, if both the mobile device 12 and the terminal device 13 log in to the service end device 11, when the mobile device 12 receives spot information edited by the user, the mobile device 12 synchronizes the spot information to the service end device 11, and the service end device 11 updates the spot information displayed in the spot information browsing webpage of the terminal device 13 (step S206). Herein the mobile device 12 may receive the spot information added, deleted, changed, or browsed by the user and synchronize the spot information to the service end device 11 through aforementioned user end application program.

Furthermore, if both the mobile device 12 and the terminal device 13 log in to the service end device 11, when the terminal device 13 receives spot information edited by the user in the spot information browsing webpage, the terminal device 13 also synchronizes the spot information to the service end device 11, and the service end device 11 synchronizes the spot information to the spot database of the mobile device 12 (step S208). Herein the terminal device 13 may receive the spot information added, deleted, changed, or browsed by the user and synchronize the spot information to the service end device 11 through aforementioned spot information browsing webpage.

Figure 3:
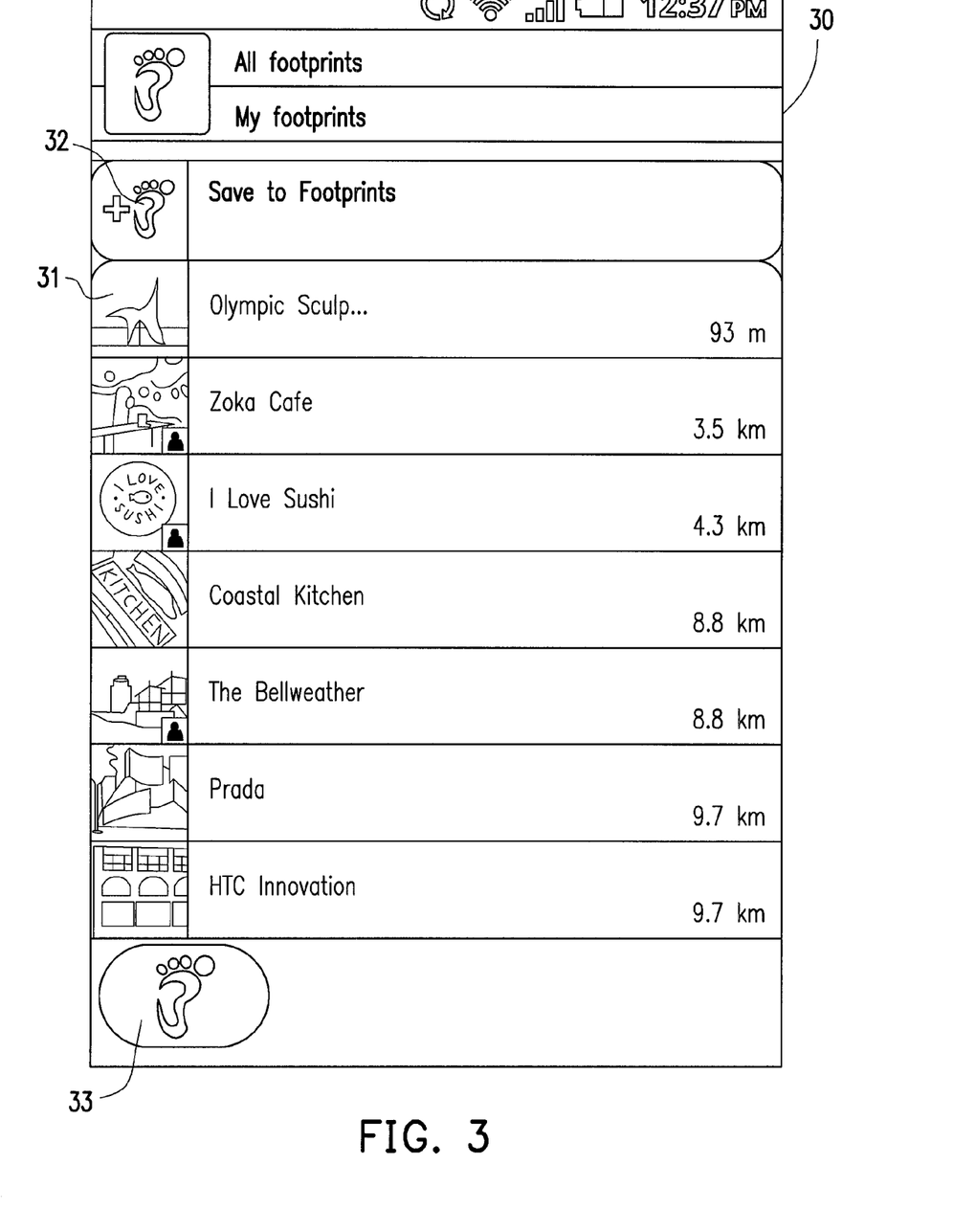
FIG. 3 illustrates an example of a user end application program interface according to an example of the application.

FIG. 3 illustrates an example of a user end application program interface according to an example of the application. Referring to FIG. 3, the application program interface 30 in the present example is an interface of an application program installed on the mobile device for managing spot information. The application program interface 30 may list all the spot information in the spot database of the mobile device 12 according to the establishing dates of the spot information or the alphabetical order of the spot names, wherein each spot information may be displayed in the application program interface 30 in a form of image such as an image 31.

The application program interface 30 may display an "ADD" button 32 to allow the user to add new spot information. After the user performs each edit operation on the spot information or after the user finishes all the edit operations on the spot information and clicks a "OK" button, the user end application program may automatically upload the edited spot information to the service end device and accordingly the service end device synchronizes the edited spot information to the spot information browsing webpage displayed in the terminal device.

The application program interface 30 may also display a "SYNCHRONIZE" button 33 to allow the user to manually synchronize the spot information. Namely, after the user finishes editing one or more spot information, the user may press down the "SYNCHRONIZE" button 33 to upload the edited spot information to the service end device and accordingly the service end device synchronizes the edited spot information to the spot information browsing webpage displayed in the terminal device.

Figure 4:
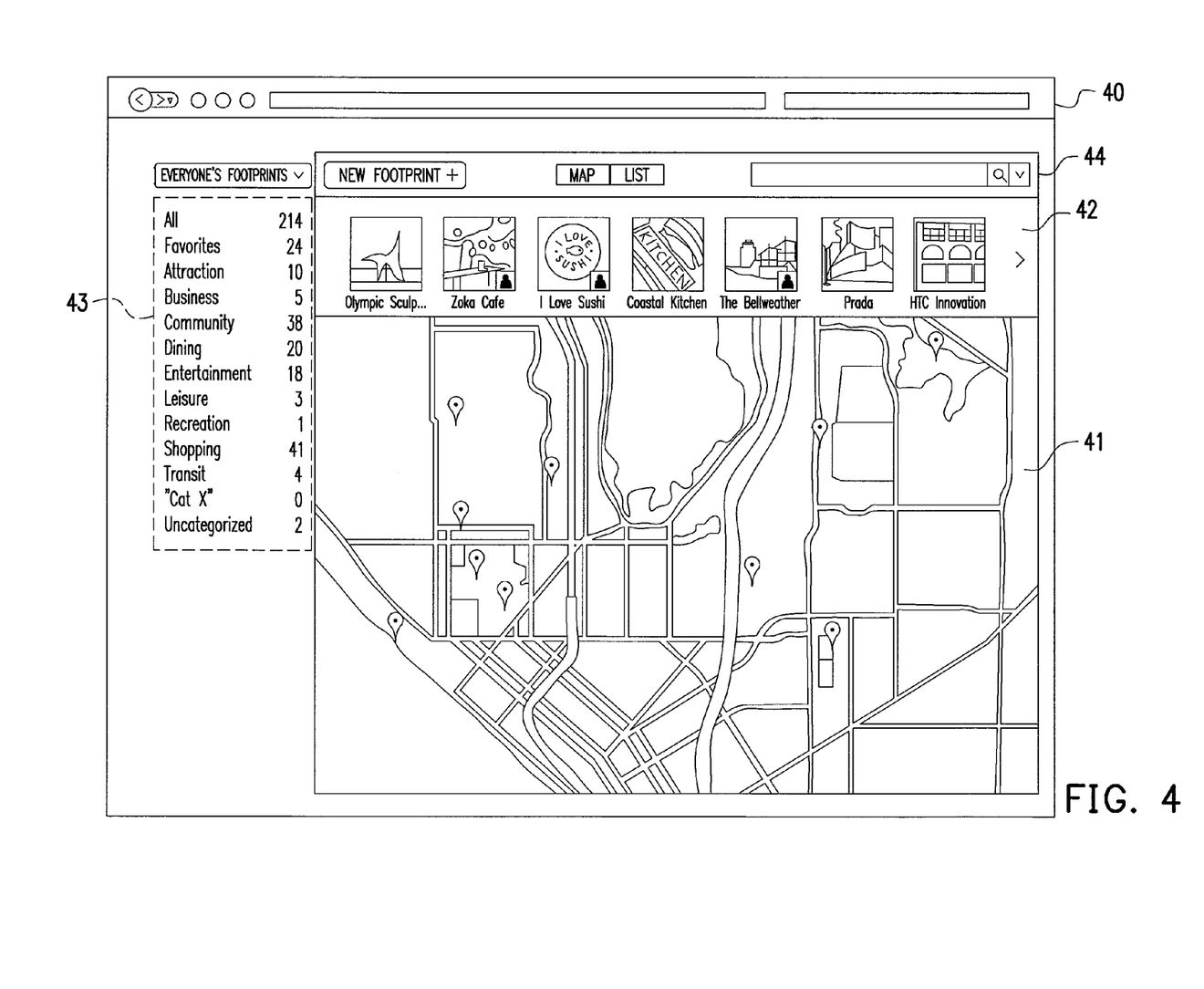
FIG. 4 illustrates an example of a spot information browsing webpage according to an example of the application.

FIG. 4 illustrates an example of a spot information browsing webpage according to an example of the application. Referring to FIG. 4, the spot information browsing webpage 40 in the present example may display the pictures of spots corresponding to the spot information synchronized from the service end device to the terminal device with a spot browsing list 42. The spot information browsing webpage 40 may also mark each spot in an electronic map 41 according to the spot location of the spot information.

Besides the electronic map 41 and the spot browsing list 42, the spot information browsing webpage 40 also displays a spot information category menu 43 and a spot information function menu 44. The category menu 43 categorizes the spot information synchronized from the terminal device to the service end device into categories such as All, Favourites, Attraction, Business, Community, Dining, Entertainment, Leisure, Recreation, Shopping, Transit, Cat X, and Uncategorized, wherein these categories may be preset by the device or defined by the user. When the user selects a specific category in the category menu 43, the terminal device displays the spot information corresponding to this category in the electronic map 41 and the attraction browsing list 42.

Furthermore, the function menu 44 may display an "ADD (NEW FOOTPRINT)" button. When the user clicks the "ADD" button, the terminal device displays a spot information edit block over the spot information browsing webpage 40 to allow the user to edit the spot information to be added.

Figure 5:
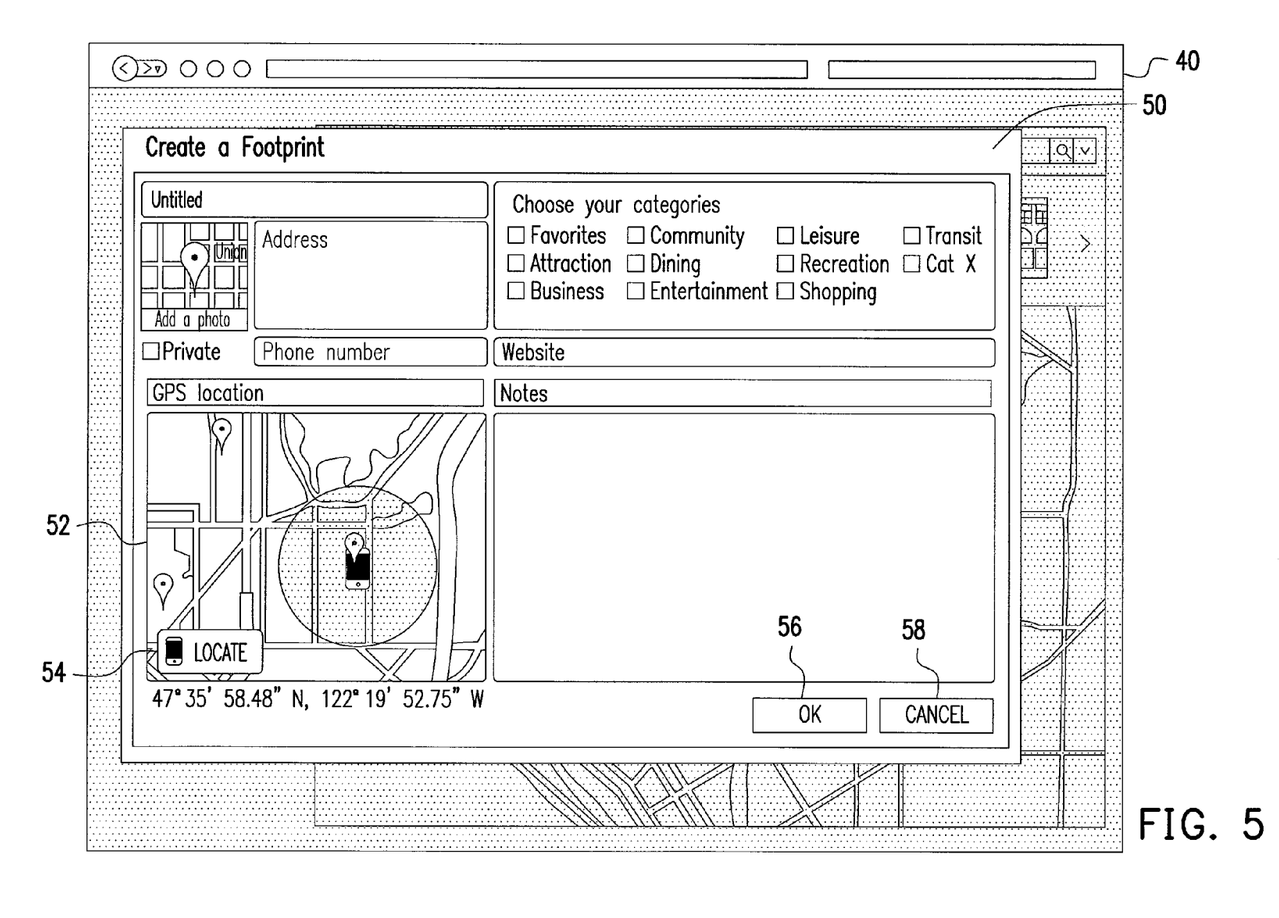
FIG. 5 illustrates an example of a spot information edit block according to an example of the application.

FIG. 5 illustrates an example of a spot information edit block according to an example of the application. Referring to both FIG. 4 and FIG. 5, when the user clicks the "ADD" button in the function menu 44, the terminal device displays the spot information edit block 50 over the spot information browsing webpage 40. The spot information edit block 50 provides a plurality of edit fields (e.g. spot name, picture, map, address, phone number, category, website, and note, etc.) such that the user can edit the spot information. For example, the mobile device is controlled to perform a positioning function by clicking the "LOCATE" button 54 in the map 52 and mark the location of the mobile device in the map 52.

The spot information edit block 50 further displays an "OK" button 56 and a "Cancel" button 58. When the terminal device receives a click operation performed by the user on the "OK" button 56, the terminal device synchronizes the spot information edited by the user to the service end device and then to the mobile device through the service end device. Contrarily, when the terminal device receives a click operation performed by the user on the "Cancel" button 58, the terminal device closes the spot information edit block 50.

It should be noted that in an example of the application, even if the user does not log in to the service end device by using the terminal device, the user can still synchronize newly edited spot information to the service end device anytime by using the mobile device. The service end device first temporarily stores the spot information synchronized from the mobile device in a storage device thereof, such as a hard disk or a memory and synchronizes the spot information to the terminal device when the terminal device logs in to the service end device. Accordingly, the user can perform simple spot information edit operations outdoors by using the mobile device, and downloads the edited spot information and further edits and adjusts the spot information by using the terminal device when he/she is back to home. Thus, the editing of spot information is made very flexible to the user.

In addition, aforementioned newly added spot information may be spot information provided by another service end device. Namely, the user can directly browse and select the spot information provided by another service end device from an original browsing webpage of the mobile device or terminal device and conveniently and instantly add the spot information to the mobile device.

Or, the newly added spot information may be provided by the same service end device but by logging in to the service end device using another login information. Namely, the user can directly browse and select the spot information provided by another user from the original browsing webpage of the mobile device or terminal device and conveniently and instantly add the spot information to the mobile device.

Moreover, the newly added spot information may be the current location information of the mobile device. Namely, the mobile device can detect its current location and search for related spot information from the original or other service end devices. If related spot information is found, the related spot information is added to the mobile device.

The application further provides a computer-readable medium, which records a computer program to be loaded into a device or a system to execute various steps of the spot information synchronization method described above. The computer program is composed of a plurality of program instructions (for example, organization chart establishing program instructions, table approving program instructions, setting program instructions, and deployment program instructions). Steps of the spot information synchronization method described above can be accomplished when these program instructions are loaded into a device or a system and executed by the same.

As described above, the application provides a method, a system, and a computer-readable medium for synchronizing spot information, wherein the spot information in a spot database of a mobile device is synchronized with the spot information in a spot information browsing webpage displayed on a terminal device through a service end device so that a user can edit the spot information by using the mobile device or the terminal device. Further, a synchronization action is carried out every time the user finishes a spot information edit operation, such that a convenient way of browsing and editing spot information is provided to the user.

It will be apparent to those skilled in the art that various modifications and variations can be made to the structure of the application without departing from the scope or spirit of the application. In view of the foregoing, it is intended that the application cover modifications and variations of this application provided they fall within the scope of the following claims and their equivalents.

What is claimed is:

1. A spot information synchronization method, adapted to synchronize a plurality of spot information displayed on a mobile device and a terminal device, the spot information synchronization method comprising:
   the mobile device logging into a service end device to synchronize spot information in a spot database of the mobile device to the service end device;
   the terminal device logging in to the service end device to download the spot synchronized from the mobile device to the service end device through an interface of a spot information browsing webpage hosted by the service end device and displaying the spot information in the spot information browsing webpage by the terminal device;
   when the mobile device receives an edited spot information by the mobile device while both the mobile device and the terminal device are logged into the service end device, the mobile device synchronizing through the interface of the spot information browsing webpage the edited spot information to the service end device, and the service end device automatically updating the edited spot information displayed in the spot information browsing webpage of the terminal device and;
   when the terminal device receives another edited spot information in the spot information browsing webpage by the terminal device while both the mobile device and the terminal device are logged into the service end device, the terminal device synchronizing the another edited spot information to the service end device through the interface of the spot information browsing webpage, and the service end device synchronizing the another edited spot information to the spot database of the mobile device.

2. The method according to claim 1, wherein the mobile device and the terminal device log in to the service end device with the same login information.

3. The method according to claim 1, wherein the step of the terminal device receiving the spot information edited by the user in the spot information browsing webpage comprises:
   the terminal device receiving new spot information added by the user in the spot information browsing webpage, wherein the new spot information is spot information provided by another service end device.

4. The method according to claim 1, wherein the step of the terminal device receiving the spot information edited by the user in the spot information browsing webpage comprises:
   the terminal device receiving new spot information added by the user in the spot information browsing webpage, wherein the new spot information is a spot information provided by logging in to the service end device by using login information different from the login information of the terminal device.

5. The method according to claim 1, wherein the step of the mobile device receiving the spot information edited by the user comprises:
   the mobile device receiving new spot information added by the user, wherein the new spot information is a spot information provided by another service end device.

6. The method according to claim 1, wherein the step of the mobile device receiving the spot information edited by the user comprises:
   the mobile device receiving new spot information added by the user, wherein the new spot information is a spot information provided by logging in to the service end device by using login information different from the login information of the mobile device.

7. The method according to claim 1, wherein after the step of the mobile device logging in to the service end device to synchronize the spot information in the spot database of the mobile device to the service end device, the spot information synchronization method further comprises:
   the service end device temporarily storing the spot information synchronized by the mobile device, and synchronizing the spot information to the terminal device when the terminal device logs in to the service end device.

8. A spot information synchronization system, comprising:
a service end device;
a mobile device, configured to log in to the service end device through an internet to synchronize spot information in a spot database to the service end device; and
a terminal device, configured to log in to the service end device through the internet to download the spot information synchronized from the mobile device to the service end device through an interface of a spot information browsing webpage hosted by the service end device and display the spot information in the spot information browsing webpage by the terminal device, wherein
when the mobile device receives edit spot information from the mobile device while both the mobile device and the terminal device are logged into the service end device, the mobile device synchronizes the edited spot information to the service end device, and the service end device updates the edit spot information displayed in the spot information browsing webpage of the terminal device; and
when the terminal device receives another edited spot information in the spot information browsing webpage by the terminal device while both the mobile device and the terminal device are logged into the service end device, the terminal device synchronizing the another edited spot information to the service end device through the interface of the spot information browsing webpage, and the service end device synchronizing the another edited spot information to the spot database of the mobile device.

9. The system according to claim 8, wherein the terminal device receives new spot information added by the user in the spot information browsing webpage, wherein the new spot information is spot information provided by another service end device.

10. The system according to claim 8, wherein the terminal device receives new spot information added by the user in the spot information browsing webpage, wherein the new spot information is spot information provided by logging in to the service end device by using login information different from login information of the terminal device.

11. The system according to claim 8, wherein the mobile device receives new spot information added by the user, wherein the new spot information is spot information provided by another service end device.

12. The system according to claim 8, wherein the mobile device receives new spot information added by the user, wherein the new spot information is spot information provided by logging in to the service end device by using a login information different from login information of the mobile device.

13. A non-transitory computer-readable storage device medium, containing computer programs for being loaded into a system comprising a mobile device, a service end device, and a terminal device to execute following steps:
the mobile device logging into a service end device to synchronize spot information in a spot database of the mobile device to the service end device;
the terminal device logging in to the service end device to download the spot information synchronized from the mobile device to the service end device through an interface of a spot information browsing webpage hosted by the service end device and displaying the edited spot information in the spot information browsing webpage by the terminal device;
when the mobile device receives an edited spot information by the mobile device while both the mobile device and the terminal device are logged into the service end device, the mobile device synchronizing through the interface of the spot information browsing webpage the edited spot information to the service end device, and the service end device automatically updating the spot information displayed in the spot information browsing webpage of the terminal device and;
when the terminal device receives another edited spot information in the spot information browsing webpage by the terminal device while both the mobile device and the terminal device are logged into the service end device, the terminal device synchronizing the another edited spot information to the service end device through the interface of the spot information browsing webpage, and the service end device synchronizing the another edited spot information to the spot database of the mobile device.

* * * * *